US009802856B2

(12) United States Patent
Nitschke et al.

(10) Patent No.: US 9,802,856 B2
(45) Date of Patent: Oct. 31, 2017

(54) METHOD FOR SUPPORTING A GLASS SHEET

(71) Applicant: GLASSTECH, INC., Perrysburg, OH (US)

(72) Inventors: Dean M. Nitschke, Maumee, OH (US); Ashoka G. Jinka, Maumee, OH (US); Thomas J. Zalesak, Rossford, OH (US); James P. Schnabel, Jr., Holland, OH (US); Scott Charles Morrow, Maumee, OH (US)

(73) Assignee: GLASSTECH, INC., Perrysburg, OH (US)

( * ) Notice: Subject to any disclaimer, the term of this patent is extended or adjusted under 35 U.S.C. 154(b) by 0 days.

(21) Appl. No.: 14/919,052

(22) Filed: Oct. 21, 2015

(65) Prior Publication Data

US 2016/0039706 A1    Feb. 11, 2016

Related U.S. Application Data

(62) Division of application No. 13/796,124, filed on Mar. 12, 2013, now Pat. No. 9,206,067.

(51) Int. Cl.
*C03B 23/025* (2006.01)
*C03B 35/20* (2006.01)
(Continued)

(52) U.S. Cl.
CPC ............ *C03B 35/207* (2013.01); *B25B 11/00* (2013.01); *C03B 23/03* (2013.01);
(Continued)

(58) Field of Classification Search
CPC .............. C03B 23/025; C03B 23/0252; C03B 23/0254; C03B 23/0256; C03B 23/0258;
(Continued)

(56) References Cited

U.S. PATENT DOCUMENTS

| 3,278,289 A | 10/1966 | Humes |
| 3,408,173 A | 10/1968 | Leflet, Jr. |

(Continued)

FOREIGN PATENT DOCUMENTS

| CN | 1518524 A | 8/2004 |
| CN | 102917990 A | 2/2013 |

(Continued)

OTHER PUBLICATIONS

PCT International Search Report and Written Opinion of the International Searching Authority Dated Jun. 13, 2014, Application No. PCT/US14/18153, Applicant Glasstech, Inc., 9 Pages.

(Continued)

*Primary Examiner* — Lisa Herring
(74) *Attorney, Agent, or Firm* — Brooks Kushman P.C.

(57) ABSTRACT

A method for supporting a heated glass sheet in connection with a glass processing operation may include adjusting a support structure so that multiple spaced apart support members of the support structure cooperate to define a shape that corresponds to a desired end shape of the glass sheet. The method may further include contacting the glass sheet with the support members until the glass sheet has been sufficiently cooled. Furthermore, the support structure may include a frame and a support assembly associated with the frame, the support assembly including the support members and a support connected to the support members such that at least a portion of each support member is adjustable with respect to the support. The support may further be connected to the frame at two locations on the frame such that the support spans an open area between the two locations on the frame.

22 Claims, 4 Drawing Sheets

(51) Int. Cl.
  *B25B 11/00* (2006.01)
  *C03B 23/03* (2006.01)
  *C03B 23/035* (2006.01)
  *C03B 27/044* (2006.01)
  *C03B 40/00* (2006.01)

(52) U.S. Cl.
  CPC ...... *C03B 23/0355* (2013.01); *C03B 27/0442* (2013.01); *C03B 40/005* (2013.01); *C03B 2225/02* (2013.01)

(58) Field of Classification Search
  CPC ..... C03B 23/03; C03B 23/035; C03B 29/025; C03B 29/08; C03B 35/207
  See application file for complete search history.

(56) References Cited

U.S. PATENT DOCUMENTS

| | | |
|---|---|---|
| 3,741,743 A | 6/1973 | Seymour |
| 3,973,943 A | 8/1976 | Seymour |
| 4,088,470 A | 5/1978 | Bourg et al. |
| 4,282,026 A | 8/1981 | McMaster et al. |
| 4,661,141 A | 4/1987 | Nitschke et al. |
| 4,746,348 A * | 5/1988 | Frank ............... C03B 23/0305 65/104 |
| 4,812,157 A | 3/1989 | Smith |
| 5,118,335 A | 6/1992 | Claassen et al. |
| 5,135,560 A | 8/1992 | Hashemi |
| 5,472,470 A | 12/1995 | Kormanyos et al. |
| 5,679,124 A | 10/1997 | Schnabel, Jr. et al. |
| 5,974,834 A * | 11/1999 | Rijkens ............... C03B 23/0252 428/426 |
| 6,543,255 B2 | 4/2003 | Bennett et al. |
| 9,296,637 B2 | 3/2016 | Nitschke et al. |
| 2008/0260999 A1 | 10/2008 | Serrano et al. |
| 2011/0302964 A1 | 12/2011 | Nitschke et al. |

FOREIGN PATENT DOCUMENTS

| | | |
|---|---|---|
| FR | 2667308 A1 | 4/1992 |
| GB | 1210887 A | 11/1970 |
| GB | 2178027 A | 2/1987 |
| JP | 60060934 A | 4/1985 |
| JP | 2000327354 A | 11/2000 |
| WO | 2012049433 A1 | 4/2012 |

OTHER PUBLICATIONS

PCT International Preliminary Report on Patentability Dated Sep. 24, 2015, Application No. PCT/US2014/018153, Applicant Glasstech, Inc., 8 Pages.
Australian Patent Examination Report No. 1, dated Nov. 29, 2016, Application No. 2014249913, Applicant Slasstech, Inc., 4 Pages.
Extended European Search Report, dated Nov. 2, 2016, Application No. 14779059.6-1375 / 2969982 PCT/US2014018153, Applicant Glasstech, Inc., 8 Pages.
Australian Patent Examination Report No. 2, dated Mar. 8, 2017, Application No. 2014249913, Applicant Glasstech, Inc., 3 Pages.
Chinese Office Action dated May 10, 2017, Application No. 201480019846.8, 5 Pages.

* cited by examiner

METHOD FOR SUPPORTING A GLASS SHEET

CROSS-REFERENCE TO RELATED APPLICATIONS

This application is a division of U.S. application Ser. No. 13/796,124, filed Mar. 12, 2013, the disclosure of which is hereby incorporated in its entirety by reference herein.

TECHNICAL FIELD

The disclosure relates to methods and apparatuses for supporting heated glass sheets in connection with glass processing operations.

BACKGROUND

Prior apparatuses for supporting glass sheets are disclosed in International Publication No. WO 2012/049433 and U.S. Pat. No. 6,543,255, for example.

SUMMARY

A method according to the present disclosure for supporting a heated glass sheet in connection with a glass processing operation may include adjusting a support structure so that multiple spaced apart support members of the support structure cooperate to define a shape that corresponds to a desired end shape of the glass sheet. The method may further include contacting the glass sheet with the support members until the glass sheet has been sufficiently cooled. Furthermore, the support structure may include a frame and a support assembly associated with the frame, the support assembly including the support members and a support connected to the support members such that at least a portion of each support member is adjustable with respect to the support. The support may further be connected to the frame at two locations on the frame such that the support spans an open area between the two locations on the frame.

While exemplary embodiments are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a schematic side view of one embodiment of a glass processing system for processing glass sheets, wherein FIG. 1 shows a heating station and a bending station of the glass processing system;

FIG. 2 is a sectional schematic, taken along line 2-2 of FIG. 1, that shows the bending station, a quench station positioned on a side of the bending station, and a support structure, according to the present disclosure, for supporting the glass sheets during at least a portion of the processing;

FIG. 6 is a side view of a rib assembly of the support structure shown in FIG. 4;

FIG. 7 is a cross-sectional view of the rib assembly taken along line 7-7 in FIG. 6 and showing a support member of the rib assembly in further detail;

DETAILED DESCRIPTION

As required, detailed embodiments are disclosed herein; however, it is to be understood that the disclosed embodiments are merely exemplary and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Furthermore, as those of ordinary skill in the art will understand, various features of the embodiments illustrated and described with reference to any one of the Figures may be combined with features illustrated in one or more other Figures to produce embodiments that are not explicitly illustrated or described. In addition, other embodiments may be practiced without one or more of the specific features explained in the following description.

During manufacture of a glass sheet product, such as a glass mirror panel for a solar power collection application, a vehicle windshield, rear window, or any other suitable product, it may be desirable to support a sheet of glass in connection with a forming or bending operation (e.g., during the forming or bending operation and/or a subsequent quench operation), or in connection with any other glass processing operation, to help achieve a desired shape for the glass product. In the present disclosure, methods and apparatuses are provided for supporting glass sheets in desired shapes during such operations so that tight tolerances may be achieved, for example. Furthermore, the disclosed methods and apparatuses may provide minimal disruption to quench fluid flow and minimal thermal contact to prevent damage to the surface of each glass sheet.

Figures 1, 2, 6, 7:
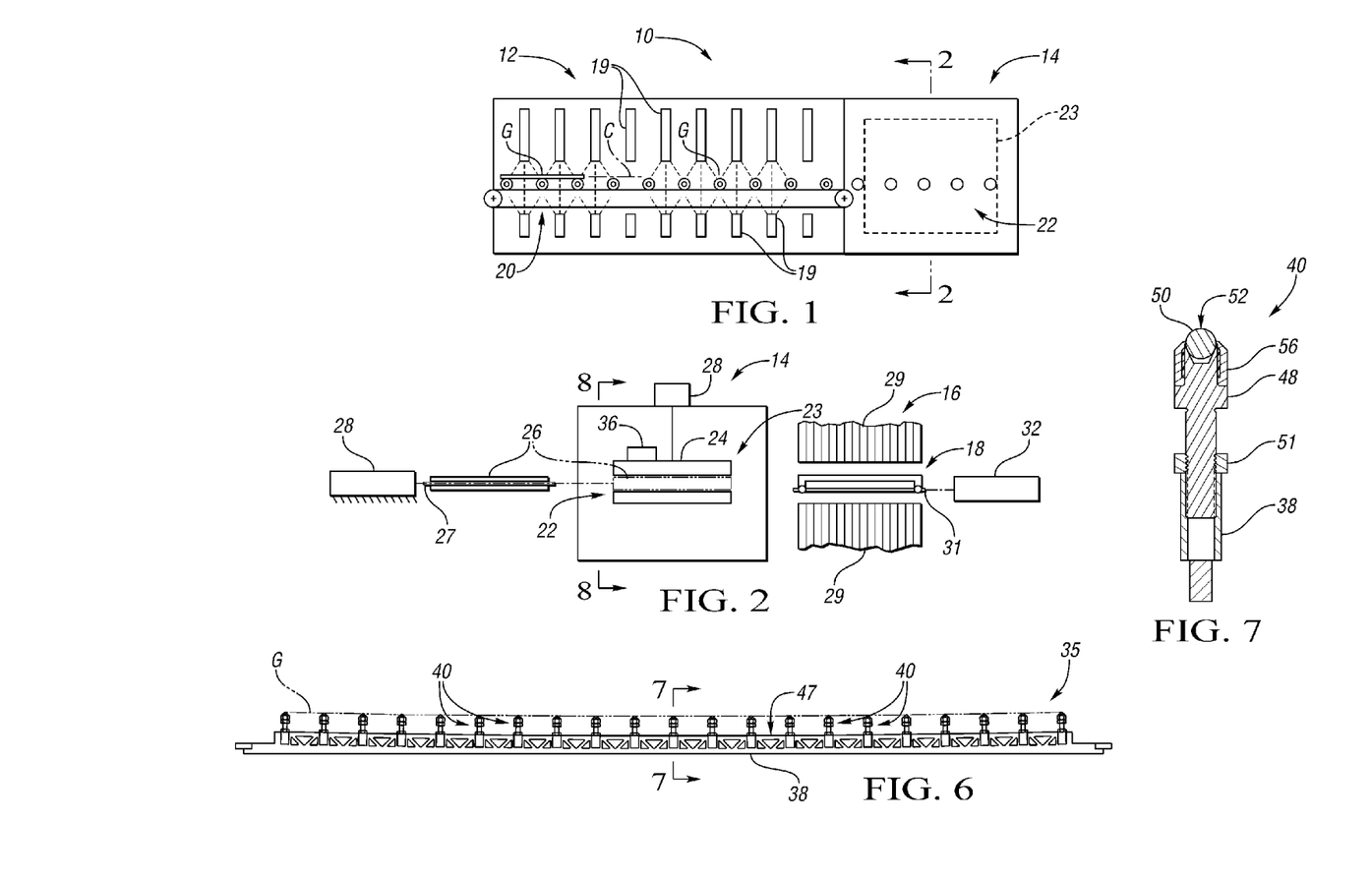

Referring to FIGS. 1 and 2, a glass processing system 10 is shown for processing glass sheets G. The system 10 includes a heating apparatus or station, such as a furnace 12, for heating the glass sheets G; a forming or bending station 14 for bending each glass sheet G into a desired shape; a cooling station, such as a quench station 16, configured to cool each glass sheet G; and a support structure 18 according to the present disclosure that may be used to transfer glass sheets G from the bending station 14 to the quench station 16 and to support the glass sheets G during bending and/or cooling.

The furnace 12 may have any suitable configuration for heating the glass sheets G. For example, the furnace 12 may include any suitable heating elements 19 positioned above and/or below a conveyor system 20, which may be used to convey the glass sheets G along a plane of conveyance C through the furnace 12. As a more detailed example, the heating elements 19 may include radiant heating elements, such as electric heaters, and/or convective heating elements, such as hot gas or hot air distributors.

Likewise, the bending station 14 may have any suitable configuration for bending each glass sheet G into a particular shape. For example, the bending station 14 may have a conveyor system 22, which may be a separate conveyor system or part of the conveyor system 20, for receiving a heated glass sheet G; and a bending apparatus 23, shown schematically in FIG. 1, for bending the glass sheet G. Referring to FIG. 2, the bending apparatus 23 may include a movable first mold, such as an upper press mold 24; a movable second mold, such as a lower peripheral press ring 26, that may be moved horizontally toward and away from the press mold 24 on a transport system, such as a shuttle 27; and one or more actuators 28 for moving the press mold 24 relative to the conveyor system 22 and the press ring 26, and for moving the shuttle 27 and press ring 26 relative to the press mold 24. With such a configuration, the glass sheet G may be press bent between a curved surface of the upper press mold 24 and the press ring 26, as explained below in detail. The press mold 24 and press ring 26 may also each be provided with a relatively soft surface treatment, such as cloth, to reduce or prevent damage to the glass sheets G during bending operations. Additional details of example forming or bending stations are disclosed in U.S. Pat. Nos. 4,282,026 and 4,661,141, which are hereby incorporated in their entirety by reference.

The quench station 16 is configured to receive each glass sheet G from the bending station 14, and quench each glass sheet G for heat strengthening or tempering or to simply cool each glass sheet G, for example. While the quench station 16 may have any suitable configuration, in the illustrated embodiment the quench station 16 is positioned on a side of the bending station 14 and includes multiple gas or air distributors 29, such as air nozzles, for exposing each glass sheet G to a quench or cooling medium, such as air.

The support structure 18 is configured to support each glass sheet G in its bent shape during transport between the bending station 14 and quench station 16, and until the glass sheet G is sufficiently quenched in the quench station 16. Alternatively or supplementally, the support structure 18 may support each glass sheet during bending at the bending station 14.

Figure 3:
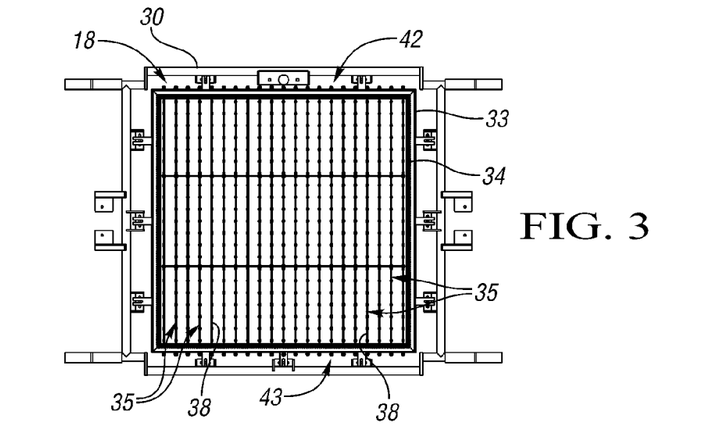
FIG. 3 is a top view of the support structure shown in FIG. 2.
Figure 4:
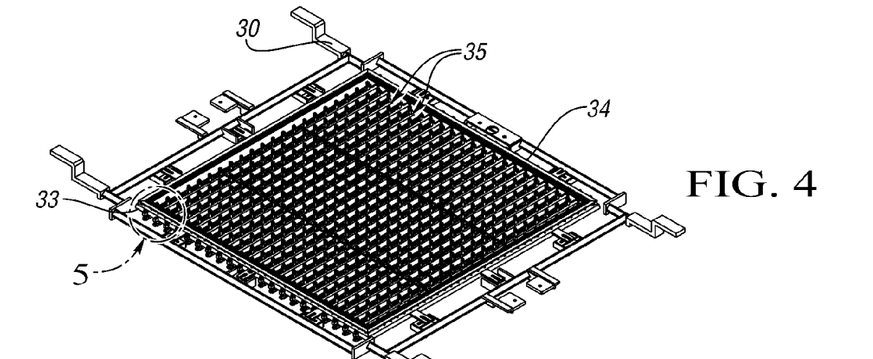
FIG. 4 is a perspective view of the support structure shown in FIG. 3.

Referring to FIGS. 3 and 4, the support structure 18 may be attached to a tool frame 30, which is movable between the bending station 14 and the quench station 16. For example, the tool frame 30 may be mounted or otherwise supported on a transport system, such as a shuttle 31 and corresponding actuator 32 shown in FIG. 2, that is operable to move the tool frame 30 horizontally between the bending station 14 and the quench station 16.

In the embodiment shown in FIGS. 3 and 4, the support structure 18 includes a peripheral sub-frame or outer frame 33 connected to the tool frame 30, a support ring or quench ring 34 adjustably supported on the outer frame 33 for supporting a peripheral portion of each glass sheet G, and one or more support assemblies, such as rib assemblies 35, associated with the outer frame 33.

Figure 5:
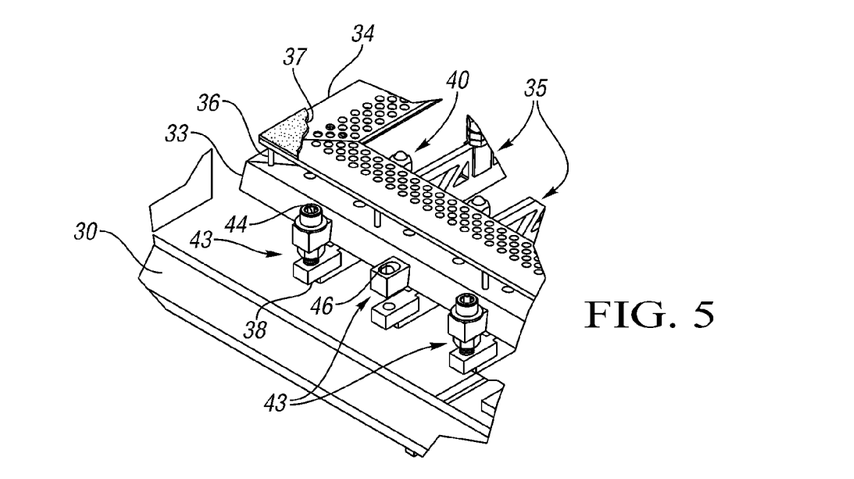
FIG. 5 is an enlarged fragmentary perspective view of a portion of the support structure shown in FIG. 4.
Figure 8:
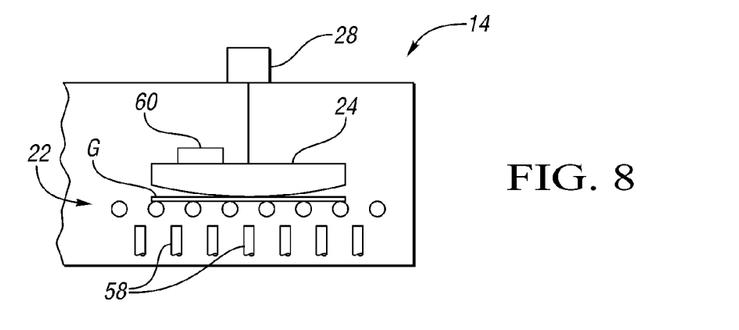
FIG. 8 is a sectional schematic, taken along line 8-8 of FIG. 2, that illustrates the manner in which an upper mold of the bending station is movable downwardly into proximity with a horizontal conveyor system to receive a heated glass sheet therefrom in preparation for a press bending cycle.

The quench ring 34 may be supported on the outer frame 33 in any suitable manner. For example, referring to FIG. 5, the quench ring 34 may be attached to multiple threaded fasteners 36 that threadingly engage the outer frame 33 such that the fasteners are adjustable with respect to the outer frame 33. Furthermore, the quench ring 34 may be provided with a relatively soft surface treatment 37 (shown partially broken away in FIG. 5), such as cloth, to reduce or prevent damage to the glass sheets G when the quench ring 34 contacts the glass sheets G.

In the illustrated embodiment, the support structure 18 includes multiple rib assemblies 35 that are spaced apart from each other. Furthermore, referring to FIGS. 3-6, each rib assembly 35 includes a laterally extending support, such as a rib 38, movably supported on the outer frame 33, and multiple spaced apart support members 40 adjustably connected to the rib 38.

While the ribs 38 may be supported on the outer frame 33 in any suitable manner, in the illustrated embodiment each rib 38 is connected to the outer frame 33 at two locations 42 and 43 on the outer frame 33, such that each rib 38 spans an open area between the associated two connection locations on the outer frame 33. Furthermore, for each rib 38, one connection location 42 on the outer frame 33 may be a fixed connection, and the other connection location 43 on the outer frame 33 may be a movable connection to allow movement of the rib 38 relative to the outer frame 33 during use. For example, each fixed connection 42 may be formed by a releasable fastener arrangement, such as one or more bolts and nuts, and each movable connection 43 may be formed by a slidable connection. As a more detailed example, referring to FIG. 5, each movable connection 43 may be formed by an engaging element 44, such as a pin, bolt, or other fastener, disposed on one component, such as a respective rib 38, that slidably engages an opening, such as an elongated slot 46, on the other component, such as the outer frame 33 (the engaging element 44 of the middle connection location 43 shown in FIG. 5 has been removed to show the elongated slot 46). With such a configuration, the ribs 38 may move with respect to the outer frame 33 to account for thermal expansion and/or contraction during use in the bending station 14 and/or quench station 16.

Referring to FIG. 6, each rib 38 may also have a curved upper surface 47 that has a shape that generally corresponds to a desired curved final shape of a particular glass sheet G. With such a configuration, the support members 40 may be finely adjusted where needed to support the glass sheet G in the desired curved final shape. As another example, each rib 38 may have a straight upper surface.

Referring to FIG. 7, each support member 40 may include a generally vertically extending support body 48, and a contact portion 50 supported by the support body 48 and configured to contact an outer surface of a respective portion, such as an inner portion (i.e., portion disposed inward of the peripheral portion), of a glass sheet G. Each support body 48 is configured to space the corresponding contact portion 50 away from a respective rib 38 to which the support member 40 is connected. Furthermore, while each support body 48 may be connected to a respective rib 38 in any suitable manner, in the illustrated embodiment each support body 48 is threadingly engaged with a rib 38 such that each support body is adjustable with respect to the rib

38. Each support member 40 may also include a locking element, such as a jam nut 51, mounted on the associated support body 48 for locking the support body 48 in a desired position with respect to the corresponding rib 38.

In addition, in the embodiment shown in FIG. 7, each contact portion 50 comprises an arcuate or curved surface 52 that is configured to make a point contact with a respective glass sheet G. For example, each contact portion 50 may be a spherical element. Furthermore, each contact portion 50 may be attached to a respective support body 48 in any suitable manner. For example, each contact portion 50 may be attached to a respective support body 48 by a threaded retaining nut or cap 56 that threadingly engages the support body 48 and has a circumferential projecting portion that engages the contact portion 50 (e.g., the opening defined by the projecting portion of the cap 56 is smaller than the diameter of the contact portion 50). As another example, each contact portion 50 may be adjustably connected to a respective support body 48, such as with a threaded connection.

While the contact portions 50 may be made of any suitable material, such as stainless steel mesh or stainless steel fiber blended into yarn (e.g., Naslon™, which is available from Nippon Seisen Co. Ltd, of Osaka, Japan), in one embodiment each contact portion 50 is made of a thermally insulating material, such as wood, fiberglass and/or a ceramic material (e.g., zirconia (zirconium oxide) or alumina (aluminum oxide), which are available in bearing form from Boca Bearing Co. of Boynton Beach, Fla.). With such a configuration, heat transfer between the glass sheets G and contact portions 50 may be minimized, while allowing maximum heat transfer between each glass sheet G and a quench medium, such as air. Likewise, each support body 48 may be made of a thermally insulating material, such as wood, fiberglass and/or a ceramic material, to minimize heat transfer between the support members 40 and the ribs 38. As another example, each support body 48 may be made of metal, such as steel, or any other suitable material.

Referring to FIGS. 1 to 11, operation of the system 10 will now be described in more detail. First, the support structure 18 may be adjusted so that the support members 40 and quench ring 34 cooperate to define a shape that corresponds to a desired final end shape, such as a curved end shape or a flat end shape, for the glass sheets G. For example, the quench ring 34, or portions thereof, may be adjusted with respect to the outer frame 33, and one or more of the support members 40, or portions thereof, may be adjusted with respect to the corresponding rib 38 or ribs 38.

Referring to FIG. 1, glass sheets G may then be loaded into the furnace 12 and onto the conveyor system 20, so that the glass sheets G may each be heated to a desired temperature (such as 600 degrees centigrade or greater) as the glass sheets G are transported through the furnace 12 along the plane of conveyance C.

Figure 9:
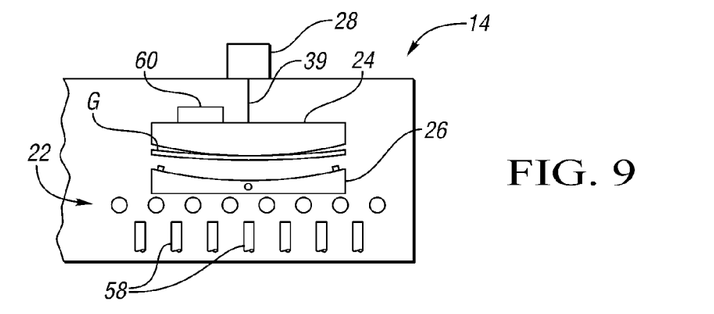
FIG. 9 is a schematic view taken in the same direction as FIG. 8 and showing the upper mold moved upwardly and a lower mold of the bending station moved from a first position at one side of the conveyor system to a second position below the upper mold.
Figure 10:
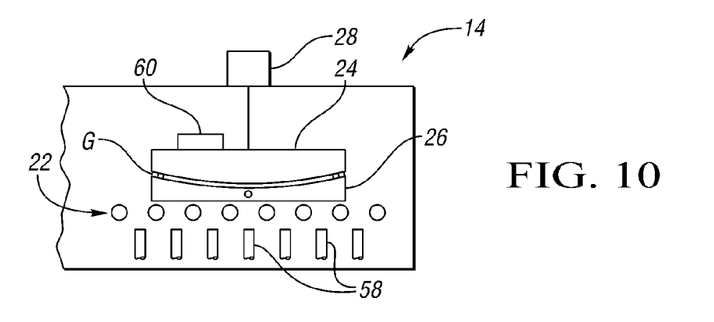
FIG. 10 is a schematic view taken in the same direction as FIG. 9 and showing the bending station after the upper mold has been moved downwardly to press bend the glass sheet against the lower mold.

Next, a particular glass sheet G may be transported into the bending station 14 by the conveyor system 20, or other transport system, and onto the conveyor system 22. Referring to FIG. 2, the press mold 24 may then be used to bend the glass sheet G. For example, referring to FIG. 8, the glass sheet G may be blown up to the press mold 24 using air jets supplied by gas jet pumps 58, and then the glass sheet G may be vacuum formed against the press mold 24 by applying a vacuum source 60 to a curved surface of the press mold 24. The press ring 26 and/or positive air pressure may also be applied along the periphery of the glass sheet G in order to shape edge portions of the glass sheet G. For example, the press ring 26 may be shuttled to a position beneath the press mold 24, as shown in FIG. 9, and the press mold 24 may be urged toward the press ring 26 and/or the press ring 26 may be urged toward the press mold 24 by suitable actuators, such as the actuators 28, to press the glass sheet G therebetween, as shown in FIG. 10.

Figure 11:
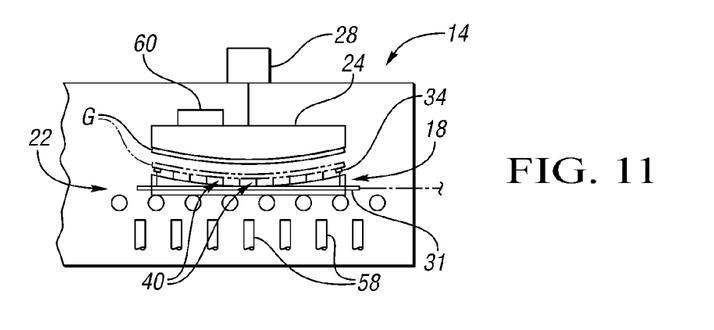
FIG. 11 is a schematic view taken in the same direction as FIG. 10 and showing the bending station after the upper mold has been moved upwardly out of engagement with the lower mold, which has been moved away from the upper mold to permit the support structure to be moved under the upper mold in order to receive the heated glass sheet therefrom.

Next, referring to FIG. 11, the press mold 24 may be raised upwardly, and then the press ring 26, if used, may be shuttled away from the press mold 24 so that the support structure 18 may be shuttled into the bending station 14 and underneath the press mold 24 using the shuttle 31. The press mold 24 having the glass sheet G thereon may then be lowered until the glass sheet G is proximate the support structure 18 (e.g., separated by 0-12 millimeters) or in contact with the support structure 18, which has the support members 40 pre-adjusted to a shape sufficient to produce the desired end shape of the glass sheet G.

Next, the vacuum applied to the press mold 24 may be reduced or eliminated to allow the glass sheet G to be released from the press mold 24, such that the glass sheet G may be fully supported by the support structure 18, as shown in phantom lines in FIG. 11. Specifically, the quench ring 34 of the support structure 18 may contact a peripheral portion of the glass sheet G, and the contact portions 50 of the support members 40 may each make a point contact with the glass sheet G at a location disposed within the peripheral portion of the glass sheet G.

Returning to FIG. 2, the support structure 18 and glass sheet G may then be transported with the shuttle 31 to the quench station 16, where the glass sheet G may be quenched to thereby temper or otherwise cool the glass sheet G. Advantageously, the support structure 18 may sufficiently support the glass sheet G in the desired end shape until the glass sheet G is sufficiently quenched, e.g., sufficiently cooled and hardened.

The number and locations of the support members 40 may be selected to sufficiently support the glass sheet G and inhibit or prevent sagging of the glass sheet G. As a result, the final shape of the glass sheet G may be accurately formed within close tolerances, such as +/−0.15 millimeters over an entire surface of the glass sheet G (which may have length and width dimensions that are each 1.5 meters or greater, for example). Moreover, the support members 40 may be configured to cause minimal disruption to quench medium flow, and provide minimal thermal contact to prevent damage to the surface of the glass sheet G. For example, if the support members 40 are configured to each provide a point contact with the glass sheet G, heat transfer between the glass sheet G and the quench medium may be maximized, since the majority of the glass sheet G will remain exposed.

Furthermore, because the support members 40 are adjustable with respect to the outer frame 33, the support structure 18 may be configured to support the glass sheet G in any one of a variety of curved shapes until the glass sheet G has been sufficiently quenched. As another example, the support structure 18 may be used to support the glass sheet G in a flat shape on condition until the glass sheet G has been sufficiently quenched.

As mentioned above, the support structure 18 may also be used during bending of a particular glass sheet G. For example, the support structure 18 may be used instead of the press ring 26, or in addition to the press ring 26, to press the glass sheet G against the press mold 24 in the bending station 14. As another example, the support structure 18 may be used as the primary mold for shaping a particular glass sheet G, such as during a sag bending operation. As a more detailed example, the first mold of the bending station 14 may be a flat mold or tile onto which a flat glass sheet G may be drawn by applying a vacuum source to the flat tile. The support structure 18 may then be shuttled into the bending station 14 beneath the flat tile, and the vacuum applied to the flat tile may be reduced or eliminated to allow the glass sheet G to be released from the flat tile, such that the glass sheet G may contact the quench ring 34 of the support structure 18. The glass sheet G may then be allowed to sag until the glass sheet G is fully supported by the support members 40 and the quench ring 34 of the support structure 18, such that the glass sheet G may be formed with a curved shape as defined by the support members 40 and quench ring 34.

As yet another example, the support structure 18 may be used to support the glass sheet G in a flat shape or condition. As a more detailed example, the support structure 18 may be used to support the glass sheet G in a flat shape during a quenching operation or other glass processing operation in which bending is not desired.

In another embodiment, the support structure 18 may be provided without the above described quench ring 34. In such an embodiment, the support structure may also be provided with one or more additional support members 40 for supporting a peripheral portion of a particular glass sheet G.

Figure 12:
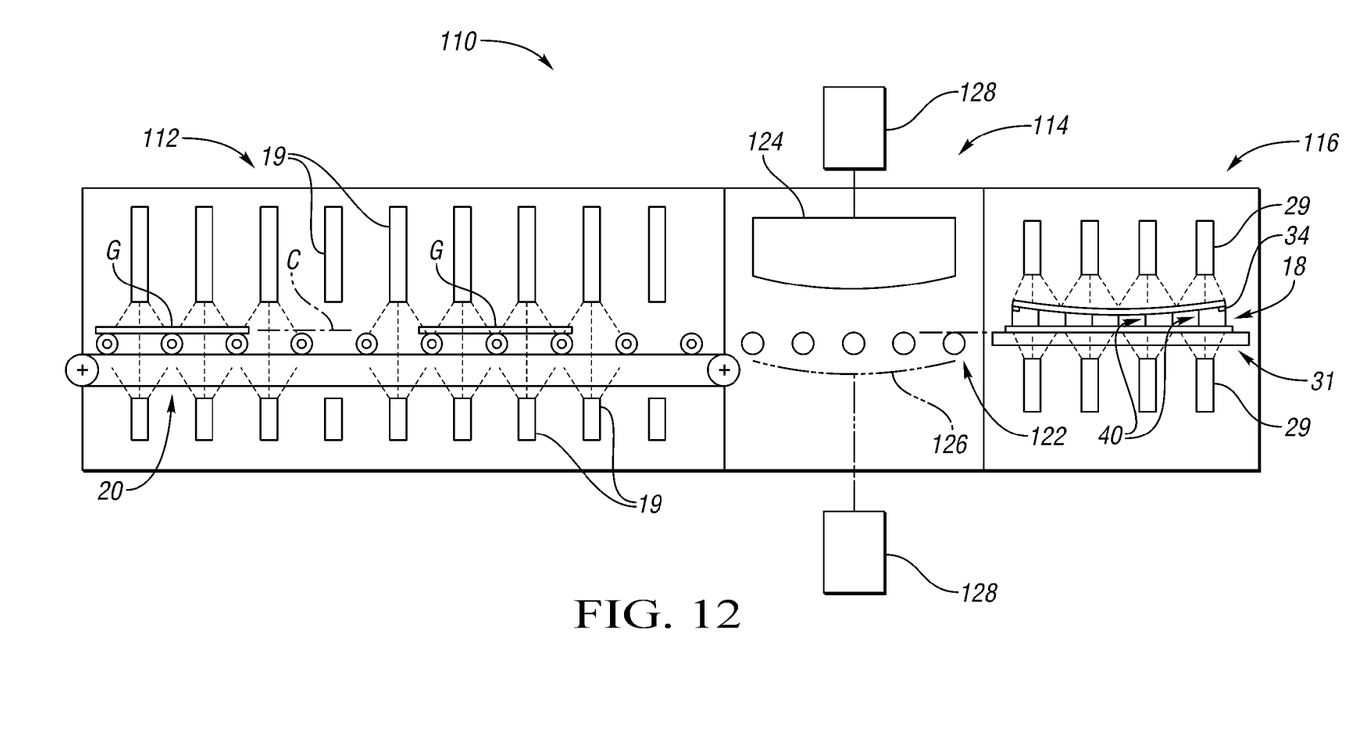
FIG. 12 is a schematic side view of another embodiment of a glass processing system with which the support structure may be used.

Referring to FIG. 12, another embodiment 110 is shown of a glass processing system with which the support structure 18 may be used. The system 110 includes a heating apparatus or station, such as a furnace 112, for heating glass sheets G; a forming or bending station 114 for bending each glass sheet G into a desired shape; and a cooling station, such as a quench station 116, configured to cool each glass sheet G. Although not required, in the embodiment shown in FIG. 12 the furnace 112, bending station 114 and quench station 116 are all axially aligned.

The furnace 112 and quench station 116 may each have any suitable configuration. For example, the furnace 112 and quench station 116 may have the same or similar components and operate in the same or similar manners as the above described furnace 12 and quench station 16, respectively. For ease of description then, the furnace 112 and quench station 116 are shown with similar components as the furnace 12 and quench station 16, respectively.

While the bending station 114 may also have any suitable configuration, in the illustrated embodiment the bending station 114 includes a conveyor system 122, such as a wheel bed, for receiving a heated glass sheet G from the furnace 112; a movable first mold, such as an upper press mold 124; a movable second mold, such as a lower peripheral press ring 126; and one or more actuators 128 that provide relative vertical movement between the conveyor system 122 and the press ring 126 and between the press ring 126 and the press mold 124. Additional details of an example bending station are disclosed in U.S. Pat. No. 6,543,255, which is hereby incorporated in its entirety by reference.

With the system 110, glass sheets G may be heated in the furnace 112 and then transferred to the bending station 114 and onto the conveyor system 122. Next, the press mold 124 may be used to bend the glass sheet G. For example, the press ring 26 may be raised above the conveyor system 122, thereby lifting the glass sheet G from the conveyor system 122, and the press ring 26 may be urged toward the press mold 124 to press the glass sheet G therebetween. The glass sheet G may then be vacuum formed against the press mold 124.

The press ring 126 may then be lowered beneath the conveyor system 122, and the support structure 18 may be shuttled into the bending station 114 using the shuttle 31. Next, in a similar manner as described above with respect to the system 10, the press mold 124 having the glass sheet G thereon may be lowered until the glass sheet G is proximate the support structure 18 (e.g., separated by 0-12 millimeters) or in contact with the support structure 18, which has the support members 40 pre-adjusted to produce the desired end shape of the glass sheet G.

Next, the vacuum applied to the press mold 124 may be reduced or eliminated to allow the glass sheet G to be released from the press mold 124, such that the glass sheet G may be fully supported by the support structure 18. Specifically, the quench ring 34 of the support structure 18 may contact a peripheral portion of the glass sheet G, and the contact portions 50 of the support members 40 may each make a point contact with the glass sheet G at a location disposed within the peripheral portion of the glass sheet G. The support structure 18 and glass sheet G may then be transported with the shuttle 31 to the quench station 116, where the glass sheet G may be quenched to thereby temper or otherwise cool the glass sheet G, for example.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, a support structure according to the present disclosure may be used with any suitable glass processing system.

What is claimed is:

1. A method for supporting a heated glass sheet in connection with a glass processing operation, wherein the glass sheet has a peripheral portion and inner portions spaced inwardly from the peripheral portion, the method comprising:

adjusting a support structure so that multiple spaced apart support members of the support structure cooperate to define a shape that corresponds to an end shape of the glass sheet;

contacting each support member of the multiple support members with a respective inner portion of the glass sheet until the glass sheet has sufficiently cooled; and contacting the peripheral portion of the glass sheet with a support ring of the support structure to support the peripheral portion of the glass sheet with the support ring;

wherein the support structure includes a frame and multiple support assemblies associated with the frame, each support assembly including a laterally extending support having opposite ends connected to the frame on opposite sides of the frame, and more than one of the support members connected to the laterally extending support such that at least a portion of each support member is adjustable with respect to the laterally extending support, and wherein the support ring is supported on the frame.

2. The method of claim 1 wherein each support member comprises a contact element that is configured to make a point contact with the glass sheet, and wherein contacting the glass sheet with the support members comprises contacting the glass sheet with the contact elements.

3. The method of claim 1 wherein each support member includes a support body adjustably connected to one of the laterally extending supports, and a contact element supported by the support body and configured to make a point contact with the glass sheet, and wherein the adjusting step comprises adjusting one or more of the support bodies with respect to a respective laterally extending support, and contacting the glass sheet with the support members comprises contacting the glass sheet with the contact elements.

4. The method according to claim 3 wherein each support member includes a threaded cap that threadingly engages a respective support body and has a circumferential projecting portion that engages a respective contact element, and wherein the projecting portion defines an opening that is smaller than a diameter of the contact element.

5. The method of claim 1 wherein each support member is threadingly connected to one of the laterally extending supports, and the adjusting step comprises turning one or more of the support members with respect to a respective laterally extending support.

6. The method of claim 1 wherein the laterally extending supports of the multiple support assemblies are spaced apart from each other and are arranged parallel to each other.

7. The method of claim 1 wherein the support ring is adjustably supported on the frame.

8. The method of claim 1 wherein the support ring has a contact surface co figured to contact the peripheral portion of the glass sheet for supporting the peripheral portion of the glass sheet, and the adjusting comprises adjusting at least one of the support members with respect to the frame to provide a glass contact portion that is located below the contact surface of the support ring.

9. The method of claim 8 wherein the adjusting comprises adjusting each of the support members with respect to the frame such that each support member provides a glass contact portion that is located below the contact surface of the support ring.

10. The method of claim 1 wherein each support member comprises a contact portion for contacting the glass sheet and a generally vertically oriented support body that supports the contact portion, and wherein for each support member, the corresponding support body spaces the corresponding contact portion away from a respective laterally extending support.

11. The method of claim 10 wherein the support ring has a contact surface configured to contact the peripheral portion of the glass sheet for supporting the peripheral portion of the glass sheet, and wherein the adjusting comprises adjusting at least one of the support members with respect to the support ring to provide a glass contact portion that is located below the contact surface of the support ring.

12. The method of claim 1 wherein, for each laterally extending support, one end is connected to the frame at a fixed connection, and the other end is connected to the frame at a slidable connection to allow movement of the laterally extending support relative to the frame during use.

13. The method of claim 12 wherein, at the slidable connection for each laterally extending support, one of the laterally extending support and the frame has a vertically oriented engaging element that is slidably received in an opening formed in the other of the laterally extending support and the frame.

14. The method of claim 1 wherein each laterally extending support has a curved upper surface having a shape that generally corresponds to a desired curved final shape of the glass sheet.

15. The method of claim 1 wherein the multiple support assemblies include three or more support assemblies.

16. The method of claim 1 wherein the multiple support assemblies include four or more support assemblies.

17. The method of claim 1 wherein number and locations of the support members are selected to sufficiently support inner portions of the glass sheet and inhibit sagging of the glass sheet so that final shape of the glass sheet may be accurately formed within +/−0.15 millimeters over an entire surface of the glass sheet.

18. A method for supporting a heated glass sheet in connection with a glass processing operation, wherein the glass sheet has a peripheral portion and inner portions spaced inwardly from the peripheral portion, the method comprising:
adjusting a support structure so that multiple spaced apart support members of the support structure cooperate to define a shape that corresponds to an end shape of the glass sheet;
contacting each support member of the multiple support members with a respective inner portion of the glass sheet until the glass sheet has sufficiently cooled; and
contacting the peripheral portion of the glass sheet with the support structure to support the peripheral portion of the glass sheet;
wherein the support structure includes a frame and multiple support assemblies associated with the frame, each support assembly including a laterally extending support having opposite ends connected to the frame on opposite sides of the frame, and more than one of the support members connected to the laterally extending support so that at least a portion of each support member is adjustable with respect to the laterally extending support.

19. The method of claim 18 wherein the laterally extending supports of the support assemblies are arranged parallel to each other and are connected to the frame so that the laterally extending supports are spaced apart from each other.

20. The method of claim 18 wherein the support structure includes a support ring adjustably supported by the frame and having a contact surface, wherein contacting the peripheral portion of the glass sheet with the support structure comprises contacting the peripheral portion of the glass sheet with the contact surface of the support ring, and wherein the adjusting comprises adjusting at least one of the support members with respect to the frame to provide a glass contact portion that is located below the contact surface of the support ring.

21. The method of claim 18 wherein the adjusting comprises adjusting each of the support members with respect to the frame so that each support member provides a glass contact portion that is located below the contact surface of the support ring.

22. The method of claim 18 wherein each laterally extending support comprises a rib, and each support member comprises a support body adjustably connected directly to one of the ribs, and a contact element supported by the support body and configured to make a point contact with the glass sheet, and wherein the adjusting step comprises adjusting one or more of the support bodies with respect to a respective rib, and contacting the glass sheet with the support members comprises contacting the glass sheet with the contact elements.

* * * * *

UNITED STATES PATENT AND TRADEMARK OFFICE
CERTIFICATE OF CORRECTION

PATENT NO. : 9,802,856 B2
APPLICATION NO. : 14/919052
DATED : October 31, 2017
INVENTOR(S) : Dean M. Nitschke et al.

Page 1 of 2

It is certified that error appears in the above-identified patent and that said Letters Patent is hereby corrected as shown below:

In the Claims

Column 8, Lines 58-59, Claim 2:
After "and wherein contacting"
Insert -- each support member of the multiple support members with a respective inner portion of --.

Column 8, Line 59, Claim 2:
After "the glass sheet"
Delete "with the support members".

Column 8, Lines 59-60, Claim 2:
After "comprises contacting"
Insert -- each contact element with a respective inner portion of --.

Column 8, Line 60, Claim 2:
After "the glass sheet"
Delete "with the contact elements".

Column 9, Line 1, Claim 3:
After "extending support, and contacting"
Insert -- each support member of the multiple support members with a respective inner portion of --.

Column 9, Lines 1-2, Claim 3:
After "the glass sheet"
Delete "with the support members".

Signed and Sealed this
Nineteenth Day of May, 2020

Andrei Iancu
*Director of the United States Patent and Trademark Office*

CERTIFICATE OF CORRECTION (continued)
U.S. Pat. No. 9,802,856 B2

Column 9, Line 2, Claim 3:
After "comprises contacting"
Insert -- each contact element with a respective inner portion of --.

Column 9, Line 3, Claim 3:
After "the glass sheet."
Delete "with the contact elements".

Column 9, Line 22, Claim 8:
After "contact surface"
Delete "co figured" and
Insert -- configured --.

Column 10, Line 47, Claim 21:
After "The method of claim"
Delete "18" and
Insert -- 20 --.